United States Patent
Nagasaka et al.

(10) Patent No.: US 7,820,762 B2
(45) Date of Patent: *Oct. 26, 2010

(54) IMPACT RESISTANCE MODIFIER AND RESIN COMPOSITION

(75) Inventors: Toshio Nagasaka, Aichia (JP); Toshimi Yanai, Hiroshima (JP); Hiroki Hatakeyama, Hiroshima (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 747 days.

This patent is subject to a terminal disclaimer.

(21) Appl. No.: 10/594,987

(22) PCT Filed: Mar. 28, 2005

(86) PCT No.: PCT/JP2005/005685

§ 371 (c)(1),
(2), (4) Date: Jan. 22, 2007

(87) PCT Pub. No.: WO2005/095480

PCT Pub. Date: Oct. 13, 2005

(65) Prior Publication Data

US 2008/0269413 A1    Oct. 30, 2008

(30) Foreign Application Priority Data

Mar. 30, 2004 (JP) .............................. 2004-098891

(51) Int. Cl.
*C08L 33/06* (2006.01)
(52) U.S. Cl. .......................... 525/228; 525/71; 525/85; 525/89; 525/94; 525/227; 525/309
(58) Field of Classification Search ............... 525/71, 525/85, 227, 228, 309, 89, 94; 428/412, 428/483, 515, 522
See application file for complete search history.

(56) References Cited

U.S. PATENT DOCUMENTS 3,793,402 A    2/1974    Owens
6,218,447 B1 *    4/2001    Sugaya et al. ............... 523/201

FOREIGN PATENT DOCUMENTS

| JP | 55-27576 | 7/1980 |
|---|---|---|
| JP | 5-17654 | 1/1993 |
| JP | 8-245854 | 9/1996 |
| JP | 10-338723 | 12/1998 |
| JP | 11-71437 | 3/1999 |
| JP | 2003-105023 | 4/2003 |

OTHER PUBLICATIONS

U.S. Appl. No. 10/594,987, filed Sep. 29, 2006, Nagasaka, et al.
U.S. Appl. No. 11/547,166, filed Oct. 2, 2006, Nagasaka, et al.
"Polymer Handbook", (Editors: J. Brandrup, et al.), 3$^{rd}$ Edition, 1989, pp. 215-216, 219, 226-227.

* cited by examiner

*Primary Examiner*—David Wu
*Assistant Examiner*—Robert Jones, Jr.
(74) *Attorney, Agent, or Firm*—Oblon, Spivak, McClelland, Maier & Neustadt, L.L.P.

(57) ABSTRACT

Disclosed is a resin composition having excellent impact resistance and resistance to whitening by impact without deteriorating excellent transparency of a methacrylic resin. Specifically, an impact resistance modifier composed of a multilayered polymer having at least three layers, namely an innermost-layer polymer derived from an alkyl methacrylate, an intermediate-layer polymer derived from an alkyl acrylate and an outer-layer polymer having its Tg within the range of 20 to 80° C., wherein mass average particle diameter of the intermediate-layer polymer is 200 to 300 nm and the mass ratio of each layer is within an appropriate range, is blended with a methacrylic resin.

2 Claims, No Drawings

IMPACT RESISTANCE MODIFIER AND RESIN COMPOSITION

TECHNICAL FIELD

The present invention relates to a resin composition having excellent transparency, impact resistance and resistance to whitening by impact and an impact resistance modifier for use in the resin composition.

BACKGROUND ART

A methacrylic resin has excellent transparency, weather resistance, moldability and processability and has been widely used in automobile parts, lighting goods, various panels and the like. However, generally, its use has been narrowed owing to its inadequate impact resistance.

Accordingly, a method of improving impact resistance of a hard resin such as methacrylic resin by adding a multilayered graft copolymer having a basic structure of three-layer structure of a specific hard-soft-hard construction to improve impact resistance of the methacrylic resin has been proposed (for example, refer to Patent Document 1). However, improvement by this method is not sufficient, though impact resistance can be improved to some extent. Further, when impact resistance of a resin is improved by such an impact resistance modifier, the resin is liable to suffer whitening by impact. Therefore, improvement of not only impact resistance but also resistance to whitening by impact has been demanded.

A method of improving resistance to whitening by impact while maintaining impact resistance by using a multilayered acrylic polymer having a specific structure has been proposed (for example, refer to Patent Document 2). However, a further improvement of impact resistance has been demanded, though resistance to whitening by impact is improved.

Although it is possible to realize higher impact resistance or resistance to whitening by impact if a large amount of an impact resistance modifier such as multilayered acrylic polymer mentioned above is used in a methacrylic resin composition, such a methacrylic resin composition has a low usefulness because its hardness is lowered. Further, it is more preferable to use smaller amount of such an impact resistance modifier as that mentioned above because the more the impact resistance modifier is used, the higher the production cost becomes. Therefore, an impact resistance modifier which can effectively improve impact resistance and resistance to whitening by impact with a small amount of its use and a resin composition in which it is used have been expected.

Patent Document 1: Japanese Patent Publication No. Sho55-27,576

Patent Document 2: Japanese Patent Application Laid-Open No. Hei10-338,723

Non-Patent Document 1: POLYMER HANDBOOK THIRD EDITION

DISCLOSURE OF INVENTION

Problem to be Solved by the Invention

The object of the present invention is to provide a resin composition having excellent impact resistance and resistance to whitening by impact without deteriorating excellent transparency of a methacrylic resin, and an impact resistance modifier for use in the resin composition.

Means for Solving Problem

In view of the present situation described above, the present inventors have intensively researched and have found that the above-mentioned problems can be solved by blending an impact resistance modifier with a methacrylic resin, wherein the modifier is composed of a multilayered polymer having at least three layers, namely an innermost-layer polymer, an intermediate-layer polymer, each having an appropriate composition, and an outer-layer polymer having its Tg within an appropriate range, and thus have completed the present invention.

Namely, the present invention resides in an impact resistance modifier composed of a multilayered graft copolymer described in the following. Such an impact resistance modifier of the present invention can provide a resin composition having excellent impact resistance and resistance to whitening by impact without deteriorating excellent transparency of a methacrylic resin.

A multilayered graft copolymer:

A multilayered graft copolymer comprising:

an innermost-layer polymer (A) obtained by polymerizing monomer components comprising 100 parts by mass of a monomer mixture composed of 40 to 100% by mass of an alkyl methacrylate having an alkyl group with carbon number of 1 to 4, 0 to 60% by mass of an alkyl acrylate having an alkyl group with carbon number of 1 to 8 and 0 to 20% by mass of the other copolymerizable monomer and 0.1 to 10 parts by mass of a polyfunctional monomer;

an intermediate-layer polymer (B) obtained by polymerizing monomer components comprising 100 parts by mass of a monomer mixture composed of 70 to 90% by mass of an alkyl acrylate having an alkyl group with carbon number of 1 to 8, 10 to 30% by mass of an aromatic vinyl compound and 0 to 20% by mass of the other copolymerizable monomer and 1 to 3 parts by mass of a polyfunctional monomer in the presence of the innermost-layer polymer (A); and an outer-layer polymer (C) having its Tg within the range of 20 to 80° C. and obtained by polymerizing monomer components composed of 50 to 100% by mass of an alkyl methacrylate having an alkyl group with carbon number of 1 to 4, 0 to 50% by mass of an alkyl acrylate having an alkyl group with carbon number of 1 to 8 and 0 to 20% by mass of the other copolymerizable monomer in the presence of a polymer which has been made up to the intermediate-layer polymer (B), wherein mass average particle diameter of the polymer which has been made up to the intermediate-layer polymer (B) is 200 to 300 nm, mass ratio (A)/(B) of the innermost-layer polymer (A) to the intermediate-layer polymer (B) is 10/90 to 40/60 and the proportion of the outer-layer polymer (C) is 30 to 100 parts by mass when the sum of the innermost-layer polymer (A) and the intermediate-layer polymer (B) is set as 100 parts by mass.

Further, the present invention resides in a resin composition containing a methacrylic resin composed mainly of constitutional units of methyl methacrylate and the above-mentioned impact resistance modifier. Such a resin composition of the present invention provides excellent impact resistance without deteriorating excellent transparency of the methacrylic resin.

EFFECT OF THE INVENTION

According to the present invention, a resin composition having excellent impact resistance without deteriorating excellent transparency of a methacrylic resin can be provided.

BEST MODE FOR CARRYING OUT THE INVENTION

Hereinafter, the present invention will be explained in detail.

In the present invention, a Tg (glass transition temperature) of a polymer means the value obtained by calculating in accordance with the conventionally known FOX equation:

$$1/Tg = a_1/Tg_1 + a_2/Tg_2 + a_3/Tg_3 + \ldots$$

wherein $Tg_1$, $Tg_2$ and $Tg_3$ represent the Tg of each homopolymer, respectively, polymerized from only one monomer component among those used in constituting the polymer and these values are referred to "POLYMER HANDBOOK THIRD EDITION" (Non-Patent Document 1). Further, $a_1$, $a_2$ and $a_3$ in the above FOX equation represent mass ratios of respective monomers among the monomer components used to constitute the polymer.

The impact resistance modifier of the present invention comprises a multilayered graft copolymer having at least three layers, namely an innermost-layer polymer (A), an intermediate-layer polymer (B) and an outer-layer polymer (C), and each layer in the multilayered graft copolymer is derived from the monomer components composed of the following composition.

The innermost-layer polymer (A) is obtained by polymerizing monomer components comprising 100 parts by mass of a monomer mixture composed of 40 to 100% by mass (preferably 40 to 95% by mass, more preferably 50 to 70% by mass) of an alkyl methacrylate having an alkyl group with carbon number of 1 to 4, 0 to 60% by mass (preferably 5 to 60% by mass, more preferably 30 to 50% by mass) of an alkyl acrylate having an alkyl group with carbon number of 1 to 8 and 0 to 20% by mass (preferably 0 to 10% by mass) of the other copolymerizable monomer and 0.1 to 10 parts by mass (preferably 0.1 to 5 parts by mass) of a polyfunctional monomer. Hereinafter, the monomer (mixture) composed of 100% by mass of an alkyl methacrylate having an alkyl group with carbon number of 1 to 4 is expressed as a "monomer mixture" for convenience.

By selecting the composition of the monomer components to fall within the above-mentioned each range, a resin composition having excellent impact resistance and transparency can be obtained. In particular, in the case that the amount of use of the alkyl methacrylate having an alkyl group with carbon number of 1 to 4 in the above-mentioned monomer mixture is 40% by mass or more, a resin composition having high-degree transparency can be obtained.

As the alkyl methacrylate having an alkyl group with carbon number of 1 to 4, methyl methacrylate, ethyl methacrylate, propyl methacrylate, n-butyl methacrylate and the like can be listed. These can be used alone or in combination of two or more kinds. Methyl methacrylate is preferably used.

Further, as the alkyl acrylate having an alkyl group with carbon number of 1 to 8, methyl acrylate, ethyl acrylate, i-propyl acrylate, n-butyl acrylate, 2-ethylhexyl acrylate and the like can be listed. These can be used alone or in combination of two or more kinds. N-butyl acrylate is preferably used.

As the other copolymerizable monomer, though it is not particularly limited as long as it can be copolymerizable with the above-mentioned monomer, for example, phenyl methacrylate, cyclohexyl methacrylate, benzyl methacrylate, methacrylic acid, acrylic acid, hydroxyethyl methacrylate, acryl amide, glycidyl methacrylate, and aromatic vinyl compounds such as styrene, α-methyl styrene, vinyltoluene can be listed. These can be used alone or in combination of two or more kinds. Styrene is preferably used. Further, a monomer having two or more copolymerizable functional groups is classified into the following polyfunctional monomer and is not classified into the other copolymerizable monomer.

As the polyfunctional monomer, ethylene glycol diacrylate, 1,3-butanediol diacrylate, allyl acrylate, ethylene glycol dimethacrylate, 1,3-butanediol dimethacrylate, allyl methacrylate, triallyl cyanurate, diallyl maleate, divinylbenzene, diallyl phthalate, diallyl fumarate, triallyl trimellitate and the like can be listed. These can be used alone or in combination of two or more kinds. Ally methacrylate and 1,3-butanediol dimethacrylate are preferably used.

The intermediate-layer polymer (B) is obtained by polymerizing monomer components comprising 100 parts by mass of a monomer mixture composed of 70 to 90% by mass (preferably 75 to 85% by mass) of an alkyl acrylate having an alkyl group with carbon number of 1 to 8, 10 to 30% by mass (preferably 15 to 25% by mass) of an aromatic vinyl compound and 0 to 20% by mass (preferably 0 to 10% by mass) of the other copolymerizable monomer, and 1 to 3 parts by mass (preferably 1.5 to 2.5 parts by mass) of a polyfunctional monomer in the presence of the innermost-layer polymer (A).

By selecting the composition of the monomer components to fall within the above-mentioned each range, a resin composition having excellent impact resistance and resistance to whitening by impact can be obtained. In particular, in the case that the amount of use of the alkyl acrylate having an alkyl group with carbon number of 1 to 8 in the above-mentioned monomer mixture is from 70 to 90% by mass, a resin composition having high-degree impact resistance and transparency can be obtained.

As the alkyl acrylate having an alkyl group with carbon number of 1 to 8, the same monomers as those listed in the examples of the alkyl acrylate usable for the innermost-layer polymer (A) in the above-mentioned multilayered graft copolymer can be used. N-butyl acrylate is preferably used.

As the aromatic vinyl compound, styrene, α-methyl styrene, vinyltoluene or the like can be listed. These can be used alone or in combination of two or more kinds. Styrene is preferably used.

As the other copolymerizable monomer, phenyl methacrylate, cyclohexyl methacrylate, benzyl methacrylate, methacrylic acid, acrylic acid, hydroxyethyl methacrylate, acryl amide, glycidyl methacrylate or the like can be listed. Further, a monomer having two or more copolymerizable functional groups is classified into the following polyfunctional monomer and is not classified into the other copolymerizable monomer.

As the polyfunctional monomer, the same monomers as those listed in the examples of the polyfunctional monomer usable for the innermost-layer polymer (A) in the above-mentioned multilayered graft copolymer can be used. These can be used alone or in combination of two or more kinds. 1,3-butanediol dimethacrylate and allyl methacrylate are preferably used.

The outer-layer polymer (C) is obtained by polymerizing monomer components composed of 50 to 100% by mass (preferably 60 to 85% by mass) of an alkyl methacrylate having an alkyl group with carbon number of 1 to 4, 0 to 50% by mass (preferably 15 to 40% by mass) of an alkyl acrylate having an alkyl group with carbon number of 1 to 8 and 0 to 20% by mass (preferably 0 to 10% by mass) of the other copolymerizable monomer in the presence of a polymer which has been made up to the above-mentioned intermediate-layer polymer (B), more precisely, in the presence of a polymer which contains the innermost-layer polymer (A) and the intermediate-layer polymer (B). Further, it is necessary that a Tg of the outer-layer polymer obtained by polymerizing these monomer components is in the range of 20 to 80° C. It is preferably 30 to 70° C. When the Tg of the outer-layer polymer is 20° C. or more, blocking does not occur at the time of its recovery as powder and the powder with good handling properties can be obtained. While, when the Tg of the outer-layer polymer is 80° C. or less, a resin composition having high-degree impact resistance can be obtained.

As the alkyl methacrylate having an alkyl group with carbon number of 1 to 4, the same monomers as those listed in the examples of the alkyl methacrylate having an alkyl group with carbon number of 1 to 4 usable for the above-mentioned innermost-layer polymer (A) can be used. Methyl methacrylate is preferably used.

As the alkyl acrylate having an alkyl group with carbon number of 1 to 8, the same monomers as those listed in the examples of the alkyl acrylate having an alkyl group with carbon number of 1 to 8 usable for the above-mentioned innermost-layer polymer (A) can be listed. N-butyl acrylate is preferably used.

Further, as the other copolymerizable monomer, the same monomers as those listed in the examples of the aromatic vinyl compound and the other copolymerizable monomer usable for the above-mentioned intermediate-layer polymer (B) can be used.

Furthermore, in the case of polymerization of these monomer components, in particular, in the case of the polymerization of these monomer components to obtain the outer-layer polymer (C), a chain transfer agent such as alkyl mercaptan is preferably used to improve compatibility with a matrix resin (for example, methacrylic resin), flowability and impact resistance of the resin composition. As the alkyl mercaptan, n-butyl mercaptan, n-octyl mercaptan, n-dodecyl mercaptan, t-dodecyl mercaptan or the like can be listed. The amount of use of the alkyl mercaptan is preferably 0.1 to 2 parts by mass to 100 parts by mass of monomer components to be used.

The mass average particle diameter of the polymer which has been made up to the intermediate-layer polymer (B) of the multilayered graft copolymer is 200 to 300 nm, preferably 230 to 260 nm. When the mass average particle diameter of the polymer which has been made up to the intermediate-layer polymer (B) is 200 nm or more, impact resistance of the resin composition becomes sufficient, and when it is 300 nm or less, the resin composition having excellent transparency can be obtained.

The mass ratio (A)/(B) of the innermost-layer polymer (A) to the intermediate-layer polymer (B) is 10/90 to 40/60, preferably 15/85 to 25/75. When the mass ratio of the innermost-layer polymer (A) is 10 or more, resistance to whitening by impact of the resin composition becomes sufficient, and when it is 40 or less, impact resistance of the resin composition becomes sufficient.

When the amount of the polymer which has been made up to the intermediate-layer polymer (B) of the multilayered graft copolymer is set as 100 parts by mass, the amount of the outer-layer polymer (C) is 30 to 100 parts by mass, preferably 50 to 80 parts by mass. When the amount of the outer-layer polymer (C) is from 30 to 100 parts by mass, impact resistance of the resulting resin composition becomes sufficient.

Now, as the mass of the polymer of each layer of the multilayered graft copolymer, that of the innermost-layer polymer (A) is calculated as the mass of the monomer mixture; that of the intermediate-layer polymer (B) is calculated as the mass of the monomer mixture; and that of the outer-layer polymer (C) is calculated as the sum of the mass of the monomer components.

The multilayered graft copolymer of the present invention may have a structure possessing the other layer in at least one side of the portions between respective layers, other than the innermost-layer polymer (A), the intermediate-layer polymer (B) and the outer-layer polymer (C).

In the present invention, latex of the multilayered graft copolymer can be obtained through emulsion polymerization of the above-mentioned monomer components, and the multilayered graft copolymer can be recovered from the latex. The emulsion polymerization can be conducted in accordance with the publicly known methods.

As the emulsifier to be used in the emulsion polymerization, any one of anionic, cationic and nonionic emulsifier can be used, and anionic emulsifier is particularly preferable. As the anionic emulsifier, a carboxylate such as potassium oleate, sodium stearate, sodium myristate, n-lauroylsarcosine sodium salt or dipotassium alkenylsuccinate, a sulfate such as sodium lauryl sulfate, a sulfonate such as dioctyl sodium sulfosuccinate, sodium dodecylbenzenesulfonate or sodium alkyldiphenyl ether disulfonate, and a phosphate such as sodium polyoxyethylene alkyl ether phosphate can be listed.

The amount of the emulsifier may be properly determined depending on the emulsifier to be used, a kind or a blend ratio of the monomer components or a polymerization condition, however, ordinarily, it is preferably 0.1 part by mass or more to 100 parts by mass of the monomer components, particularly preferably 0.5 part by mass or more. Further, it is preferably 10 parts by mass or less to 100 parts by mass of the monomer components, particularly preferably 5 parts by mass or less to reduce its residue in the polymer.

The polymerization initiator to be used in the polymerization to constitute each layer of the multilayered graft copolymer is not particularly limited, and as a radical initiator, for example, a peroxide such as benzoyl peroxide, cumene hydroperoxide, t-butyl hydroperoxide or hydrogen peroxide, an azo compound such as azobisisobutyronitrile; a persulfuric acid compound such as potassium persulfate or ammonium persulfate; a perchloric acid compound; a perboric acid compound; and a redox system initiator composed of a combination of a peroxide and a reductive sulfoxy compound can be listed. The amount of addition of the radical initiator is variable depending on a kind or a blend ratio of the radical initiator or the monomer components to be used, however, it is ordinarily about 0.01 to 10 parts by mass to 100 parts by mass of the monomer components.

The monomer components and the polymerization initiator can be added by using a method such as collective addition, divisional addition, continuous addition, monomer addition, emulsion addition or the like in the production of the multilayered graft copolymer. Further, the reaction system may be replaced by nitrogen to advance the reaction smoothly or a properly selected catalyst may be added, if needed, after the completion of the reaction to remove the residual monomer. Moreover, when polymerization is carried out to constitute each layer, an additive such as pH adjustor, antioxidant or ultraviolet absorbent can be coexisted.

The amount of solid content in latex of the multilayered graft copolymer thus obtained is preferably 10% by mass or more, particularly preferably 30% by mass or more to raise the productivity of the polymer. Further, the amount of solid content in the latex is preferably 60% by mass or less, particularly preferably 50% by mass or less not to deteriorate the stability of the latex.

As methods for recovering the multilayered graft copolymer from the above-mentioned latex, various methods such as coagulation with acids, coagulation with salts, freeze-coagulation and spray drying can be used. Coagulation with acids or coagulation with salts is preferable in view of production cost and the physical properties of the product to be obtained. As the recovering agent to be used in coagulation with salts, an inorganic salt such as aluminum chloride, aluminum sulfate, sodium sulfate, magnesium sulfate, sodium nitrate or calcium acetate can be listed, and calcium acetate is particularly preferable to prevent coloring of the molded article obtained by molding the resin composition in which the recovered multilayered graft copolymer was used as an impact resistance modifier. These are ordinarily used in the form of aqueous solutions. The concentration of the recovering agent aqueous solution is preferably 0.1 to 20% by mass, more preferably 1 to 15% by mass. When the concentration is too low, there is a case that the multilayered graft copolymer cannot be recovered stably, and when the concentration is too high, there is a case that a large amount of the recovering agent remain in the recovered multilayered graft copolymer and cause a deterioration of the performance of the molded article such as enhanced coloring, and hence, these are not preferable. By coexisting latex of a rigid polymer having small particle diameter when latex of the multilayered graft copolymer is contacted with the recovering agent, handling properties of the resultant latex is improved because blocking of the recovered multilayered graft copolymer does not tend to occur. When the latex is contacted with the recovering agent aqueous solution, temperature of the system is preferably 30 to 100° C. The deposited multilayered graft copolymer is washed, dehydrated and dried in various ways. By adding a lubricant such as silica gel to the dried multilayered graft copolymer, handling properties of the multilayered graft copolymer is improved because blocking of the multilayered graft copolymer does not tend to occur.

The resin composition of the present invention contains a methacrylic resin composed mainly of constitutional units of methyl methacrylate and the impact resistance modifier composed of the above-mentioned multilayered graft copolymer. This resin composition provides excellent impact resistance without deteriorating excellent transparency and hardness of the methacrylic resin.

The blend ratio of the methacrylic resin to the impact resistance modifier is preferably 90/10 to 20/80 in terms of the mass ratio of the methacrylic resin to the impact resistance modifier, though it is variable depending on the use. When the mass ratio of the impact resistance modifier is 10 or more, more sufficient impact resistance of the resin composition can be obtained, and when it is 80 or less, flowability easy for molding such as injection molding can be secured and more excellent appearance (such as transparency) of the molded article can be obtained. The mass ratio of the methacrylic resin to the impact resistance modifier is more preferably 80/20 to 30/70.

The methacrylic resin composed mainly of constitutional units of methyl methacrylate to be used in the present invention is preferably a polymer of monomer component(s) composed of 50 to 100% by mass of methyl methacrylate and 0 to 50% by mass of the other vinyl or vinylidene monomer. As the other vinyl or vinylidene monomer, for example, an alkyl acrylate having an alkyl group with carbon number of 1 to 4; or an aromatic vinyl compound such as styrene, α-methyl styrene or vinyltoluene can be listed. The content of methyl methacrylate in the above monomer component(s) is preferably 80 to 99% by mass.

The resin composition of the present invention is obtained by blending the above-mentioned methacrylic resin and multilayered graft copolymer in a predetermined blending ratio.

The resin composition of the present invention may contain antioxidants, ultraviolet absorbents, photostabilizers, mold release agents, pigments, dyes and the like other than the above-mentioned methacrylic resin and multilayered graft copolymer.

EXAMPLES

Hereinafter, the present invention will be explained in more detail by using examples. In the examples, "part(s)" means "part(s) by mass", and "%" means "% by mass" other than Haze %. The characteristic properties of the multilayered graft copolymer and the resin composition are obtained by using the following methods.

(Mass Average Particle Diameter)

The mass average particle diameter of the polymer which has been made up to the intermediate-layer polymer (B) of the multilayered graft copolymer is measured as follows. The obtained latex was diluted with distilled water to obtain diluted latex with solid content of about 3%. Using 0.1 ml of the diluted latex as a sample, mass average particle diameter of the sample was measured with CHDF 2000 High Resolution Particle Size Distributions manufactured by Matec Applied Sciences, U.S.A., under the conditions of: the flow rate of 1.4 ml/min; the pressure of about 2.76 MPa (about 4,000 psi); the temperature of 35° C. In the measurement, a capillary cartridge for particle fractionation and a carrier liquid were used wherein the liquid pH was neutral. Prior to the measurement, a calibration curve was obtained by using monodisperse polystyrene of known particle diameter manufactured by Duke Scientific Corporation, U.S.A. as a particle size standard, and by measuring total points of 12 of the standard particle diameters of from 0.02 μm to 0.8 μm.

(Evaluation of the Resin Composition)

The obtained resin composition was injection molded under the following conditions and various properties were measured.

Device: PS-60E Type (trade name) injection molding machine manufactured by Nissei Plastic Industrial Co., Ltd.

Cylinder temperature: 260° C.

Test piece size:

127 mm×12.7 mm×6.35 mm (thickness) (for Izod impact strength test)

100 mm×50 mm×2 mm (thickness) (for Haze measurement)

(Measurement of Izod Impact Strength)

Izod impact strength was measured according to ASTM-D-256.

(Measurement of Haze/Evaluation of Transparency)

Haze was measured according to ASTM-D1003 using a flat plate test piece of 2 mm in thickness.

(Evaluation of Resistance to Whitening by Impact)

Using Du Pont type Impact Tester (trade name: H-100, manufactured by Toyo Seiki Seisaku-Sho, Ltd.) under the conditions of: radius of base of 16.2 mm; radius of impact punch of 12.7 mm; falling weight of 1 Kg; falling height of 50 cm, impact was given to a test piece and appearance of the test piece at the time when 24 hours have past after the impact test was observed by visual inspection.

○: Whitening was not observed or the extent of whitening was extremely small.

x: Whitening was observed.

The following abbreviations were properly used.

| | |
|---|---|
| FE: | ferrous sulfate |
| EDTA: | disodium ethylenediaminetetraacetate |
| SFS: | sodium formaldehyde sulfoxylate |
| MMA: | methyl methacrylate |
| ST: | styrene |
| BA: | n-butyl acrylate |
| AMA: | allyl methacrylate |
| 13BD: | 1,3-butanediol dimethacrylate |
| MA: | methyl acrylate |
| TBH: | t-butyl hydroperoxide |
| CHP: | cumene hydroperoxide |
| NA: (polyoxyethylene alkyl ether phosphate: | the following emulsifier PHOSPHANOL RS-610NA, trade name, manufactured by Toho Chemical Industry Co., Ltd.) |
| nOM: | n-octyl mercaptan |
| methacrylic resin (AP-1): | ACRYPET V (trade name, manufactured by Mitsubishi Rayon Co., Ltd.) |
| methacrylic resin (AP-2): | ACRYPET SV (trade name, manufactured by Mitsubishi Rayon Co., Ltd.) |

Example 1

Production of Multilayered Graft Copolymer (1)

To a five-neck flask equipped with a stirrer, a reflux condenser, a nitrogen inlet, a monomer inlet and a thermometer, the following component 1 was introduced.

| (Component 1) | |
|---|---|
| Deionized water | 190 parts |
| SFS | 0.4 part |
| FE | $4.2 \times 10^{-5}$ part |
| EDTA | $1.3 \times 10^{-4}$ part |

Then, the system was heated to 80° C. under stirring and mixing while replaced by nitrogen, one tenth of a mixture (a-1) having the following composition was introduced into it and the system was kept at 80° C. for 15 minutes. Then, the remainder of the mixture (a-1) was introduced into it by taking 50 minutes (0.34 part/min), the system was kept at 80° C. for 1 hour to complete polymerization of the innermost-layer polymer. Polymerization rate (unreacted monomer being measured with gas chromatography; hereinafter the same) of the latex (A-1) thus obtained was 99% or more.

| (Mixture (a-1)) | |
|---|---|
| MMA | 11.15 parts |
| ST | 0.85 part |
| BA | 8.00 parts |
| 13BD | 0.60 part |
| AMA | 0.075 part |
| TBH | 0.035 part |
| NA | 0.72 part |

Subsequently, to the above-mentioned latex (A-1), a solution in which 0.27 part of SFS was dissolved in 5.0 parts of deionized water was added and the system was kept for 15 minutes, and a mixture (b-1) having the following composition was dropped into it by taking 4 hours (0.35 part/min), and the system was kept for 2 hours to complete polymerization of the intermediate-layer polymer. Polymerization rate of the latex (B-1) thus obtained was 99% or more, and the mass average particle diameter of the polymer which has been made up to the intermediate-layer polymer was 235 nm.

| (Mixture (b-1)) | |
|---|---|
| ST | 14.0 parts |
| BA | 66.0 parts |
| 13BD | 0.20 part |
| AMA | 1.40 parts |
| CHP | 0.22 part |
| NA | 1.50 parts |

Subsequently, to the above-mentioned latex (B-1), a solution in which 0.23 part of SFS was dissolved in 5.0 parts of deionized water was added and the system was kept for 15 minutes, and a mixture (c-1) having the following composition was dropped into it by taking 2 hours and 20 minutes (0.50 part/min), and the system was kept for 1 hour to complete polymerization of the outer-layer polymer. Polymerization rate of the latex (C-1) thus obtained was 99% or more. Tg of the outer-layer polymer is shown in Table 2.

| (Mixture (c-1)) | |
|---|---|
| MMA | 41.8 parts |
| BA | 15.0 parts |
| ST | 3.2 parts |
| TBH | 0.10 part |
| nOM | 0.12 part |

Then, 300 parts of 1.5% calcium acetate aqueous solution was introduced into a stainless steel container as a recovering agent aqueous solution and heated to 60° C. under stirring and mixing, and 300 parts of the above-mentioned latex (C-1) was added to it continuously for 10 minutes. Then, the resultant mixture was heated to 90° C. and kept for 5 minutes. Then, the mixture was cooled to the room temperature and filtrated by centrifugal dehydration (1300 G, for 3 minutes) while washed with deionized water and a wet resin was obtained. The resultant resin was dried at 75° C. for 48 hours and white powdery multilayered graft copolymer (1) was obtained.

TABLE 1

| | | Component 1 (part) | a-1 (part) | | | | | | | | b-1 (part) | | |
|---|---|---|---|---|---|---|---|---|---|---|---|---|---|
| | Kind | NA | MMA | ST | BA | 13BD | AMA | TBH | NA | ST | BA | 13BD |
| Ex. 1 | (1) | 0.00 | 11.15 | 0.85 | 8.00 | 0.60 | 0.075 | 0.035 | 0.72 | 14.0 | 66.0 | 0.20 |
| Ex. 2 | (2) | 0.00 | 22.30 | 1.70 | 16.00 | 1.20 | 0.150 | 0.070 | 1.44 | 10.5 | 49.5 | 0.15 |
| Ex. 3 | (3) | 0.00 | 11.15 | 0.85 | 8.00 | 0.60 | 0.075 | 0.035 | 0.60 | 14.8 | 65.2 | 0.20 |
| Ex. 4 | (4) | 0.00 | 11.15 | 0.85 | 8.00 | 0.60 | 0.076 | 0.035 | 0.60 | 14.8 | 66.2 | 0.20 |
| Ex. 5 | (5) | 0.00 | 13.94 | 1.06 | 10.00 | 0.75 | 0.094 | 0.044 | 0.90 | 13.1 | 61.9 | 0.19 |
| Ex. 6 | (6) | 0.00 | 13.94 | 1.06 | 10.00 | 0.75 | 0.094 | 0.044 | 0.75 | 13.9 | 61.1 | 0.19 |
| Comp. Ex. 1 | (7) | 0.00 | 22.30 | 1.70 | 16.00 | 1.20 | 0.150 | 0.070 | 1.52 | 10.5 | 49.5 | 0.15 |
| Comp. Ex. 2 | (8) | 0.00 | 13.94 | 1.06 | 10.00 | 0.75 | 0.094 | 0.044 | 0.75 | 13.9 | 61.1 | 0.00 |
| Comp. Ex. 3 | (9) | 0.00 | 11.15 | 0.85 | 8.00 | 0.60 | 0.075 | 0.035 | 0.60 | 14.8 | 65.2 | 0.20 |
| Comp. Ex. 4 | (10) | 0.00 | 0.00 | 0.00 | 0.00 | 0.00 | 0.000 | 0.000 | 0.00 | 18.5 | 81.5 | 0.00 |
| Comp. Ex. 5 | (11) | 0.10 | 11.15 | 0.85 | 8.00 | 0.60 | 0.075 | 0.035 | 0.32 | 14.0 | 66.0 | 0.20 |
| Comp. Ex. 6 | (12) | 0.00 | 11.15 | 0.85 | 8.00 | 0.60 | 0.075 | 0.035 | 0.14 | 14.0 | 66.0 | 0.20 |

| | | b-1 (part) | | | | c-1 (part) | | | | | | |
|---|---|---|---|---|---|---|---|---|---|---|---|---|
| | | AMA | CHP | TBH | NA | MMA | BA | ST | MA | TBH | NA | nOM |
| | Ex. 1 | 1.40 | 0.23 | 0.00 | 1.50 | 41.8 | 15.0 | 3.2 | 0.0 | 0.10 | 0.00 | 0.12 |
| | Ex. 2 | 1.06 | 0.17 | 0.00 | 1.12 | 57.0 | 6.0 | 0.0 | 3.0 | 0.10 | 0.00 | 0.18 |
| | Ex. 3 | 1.40 | 0.00 | 0.24 | 1.50 | 53.1 | 14.0 | 2.9 | 0.0 | 0.11 | 0.00 | 0.29 |
| | Ex. 4 | 1.40 | 0.00 | 0.24 | 1.50 | 57.4 | 10.5 | 2.1 | 0.0 | 0.11 | 0.00 | 0.29 |
| | Ex. 5 | 1.31 | 0.21 | 0.00 | 1.41 | 39.5 | 24.2 | 5.3 | 0.0 | 0.12 | 0.00 | 0.14 |
| | Ex. 6 | 0.86 | 0.00 | 0.22 | 1.40 | 48.0 | 17.3 | 3.7 | 0.0 | 0.10 | 0.46 | 0.29 |
| | Comp. Ex. 1 | 1.05 | 0.00 | 0.17 | 0.96 | 57.0 | 0.0 | 0.0 | 3.0 | 0.10 | 0.00 | 0.18 |
| | Comp. Ex. 2 | 0.67 | 0.00 | 0.23 | 1.41 | 48.0 | 18.8 | 4.1 | 0.0 | 0.11 | 0.50 | 0.31 |
| | Comp. Ex. 3 | 1.40 | 0.00 | 0.24 | 1.50 | 36.4 | 32.2 | 1.4 | 0.0 | 0.11 | 0.00 | 0.29 |
| | Comp. Ex. 4 | 1.10 | 0.00 | 0.30 | 2.40 | 56.6 | 10.4 | 2.1 | 0.0 | 0.10 | 0.46 | 0.29 |
| | Comp. Ex. 5 | 1.40 | 0.23 | 0.00 | 1.28 | 41.8 | 15.0 | 3.2 | 0.0 | 0.10 | 0.00 | 0.12 |
| | Comp. Ex. 6 | 1.40 | 0.23 | 0.00 | 0.56 | 41.8 | 15.0 | 3.2 | 0.0 | 0.10 | 0.00 | 0.12 |

*The other components of the component 1 are the same as those written in the specification.

TABLE 2

| | | Multilayered graft coplymer composition | | | | |
|---|---|---|---|---|---|---|
| | Kind | Tg of the outer layer polymer °C. | (a-1)/(b-1) | Amount of polyfunctional monomer in (b-1) To 100 parts of the monomer mixture of (b-1) | ((a-1) + (b-1))/(c-1) | Result of polymerization Mass average particle diameter of B nm |
| Ex. 1 | (1) | 47 | 28/80 | 2.00 | 100/60 | 235 |
| Ex. 2 | (2) | 77 | 40/60 | 2.00 | 100/60 | 270 |
| Ex. 3 | (3) | 57 | 20/80 | 2.00 | 100/70 | 236 |
| Ex. 4 | (4) | 68 | 20/80 | 2.00 | 100/70 | 237 |
| Ex. 5 | (5) | 28 | 26/75 | 2.00 | 100/69 | 220 |
| Ex. 6 | (6) | 47 | 25/75 | 1.40 | 100/69 | 225 |
| Comp. Ex. 1 | (7) | 99 | 40/60 | 2.00 | 100/60 | 240 |
| Comp. Ex. 2 | (8) | 44 | 26/75 | 0.89 | 100/70.9 | 215 |
| Comp. Ex. 3 | (9) | 10 | 20/80 | 2.00 | 100/70 | 235 |
| Comp. Ex. 4 | (10) | 68 | 0/100 | 1.10 | 100/69.1 | 245 |
| Comp. Ex. 6 | (11) | 47 | 20/80 | 2.00 | 100/60 | 155 |
| Comp. Ex. 6 | (12) | 47 | 20/80 | 2.00 | 100/60 | 336 |

Example 7

Preparation of Resin Composition Blended with an Impact Resistance Modifier and Evaluation Thereof Next, a mixture of 400 parts of the multilayered graft copolymer (1) and 600 parts of methacrylic resin (AP-1) was melt kneaded by using a twin-screw extruder having its external diameter of 30 mmφ (PCM-30 (trade name); L/D=25; manufactured by Ikegai Corporation) at a cylinder temperature of 230° C. to 260° C. and a die temperature of 260° C. to obtain a pellet of a resin composition having its blend ratio (methacrylic resin (AP-1))/(multilayered graft copolymer (1)) of 60/40 (mass ratio). Then, an molded article was manufactured by using the pellet and its physical properties such as Izod impact strength and Haze were evaluated and the results are shown in Table 3.

TABLE 3

| | Matrix resin | | Maltilayered graft copolymer | | Physical properties | | |
|---|---|---|---|---|---|---|---|
| | | | | | Izod impact strength | Haze | Evaluation of resistance to whitening by impact Visual |
| | Kind | Part by mass | Kind | Part by mass | J/m | % | inspection |
| Ex. 7 | AP-1 | 60 | (1) | 40 | 63 | 0.6 | ○ |
| Ex. 8 | AP-1 | 60 | (2) | 40 | 50 | 0.8 | ○ |
| Ex. 9 | AP-1 | 60 | (3) | 40 | 57 | 0.4 | ○ |
| Ex. 10 | AP-1 | 60 | (4) | 40 | 55 | 0.4 | ○ |
| Ex. 11 | AP-1 | 60 | (5) | 40 | 54 | 0.6 | ○ |
| Ex. 12 | AP-1 | 60 | (6) | 40 | 55 | 0.6 | ○ |
| Comp. Ex. 7 | AP-1 | 60 | (7) | 40 | 41 | 0.5 | ○ |
| Comp. Ex. 8 | AP-1 | 60 | (8) | 40 | 53 | 0.4 | x |
| Ex. 13 | AP-2 | 60 | (1) | 40 | 61 | 0.6 | ○ |
| Comp. Ex. 9 | AP-2 | 60 | (10) | 40 | 64 | 0.9 | x |
| Comp. Ex. 10 | AP-2 | 60 | (12) | 40 | 68 | 1.6 | ○ |
| Ex. 14 | AP-2 | 75 | (1) | 25 | 37 | 0.4 | ○ |
| Comp. Ex. 11 | AP-2 | 75 | (11) | 25 | 26 | 0.5 | ○ |

Examples 2 to 6, Comparative Examples 1 to 6

Production of Multilayered Graft Copolymers (2) to (12)

The same procedures as in the method for producing the multilayered graft copolymer (1) described in Example 1 were carried out except that the amount of addition of respective raw materials was changed as in Table 1, and multilayered graft copolymers (2) to (12) were obtained. Further, mass average particle diameters of these intermediate-layer polymers and each Tg of these outer-layer polymers are shown in Table 2. The multilayered graft copolymer (9) could not be recovered as powder because it agglomerated at the time of coagulation and recovery.

Examples 7 to 14, Comparative Examples 7 to 11

Preparation of Resin Compositions Blended with Impact Resistance Modifiers and Evaluation Thereof The same procedures as in Example 1 were carried out by using the multilayered graft copolymers thus obtained and pellets of resin compositions having their blend ratio (methacrylic resin (AP-1) or (AP-2))/(multilayered graft copolymers (1) to (8) or (10) to (12)) of 60/40 or 75/25 (all In mass ratio) were manufactured and their physical properties were evaluated and the results are shown in Table 3.

As mentioned above, it was proved that the impact resistance modifier satisfying the constitution of the present invention has an excellent improvement effect on impact resistance and resistance to whitening by impact without deteriorating transparency. Further, the resin composition which used the impact resistance modifier had high-degree impact resistance, excellent transparency and resistance to whitening by impact.

INDUSTRIAL APPLICABILITY

The resin composition of the present invention is excellent in transparency, impact resistance, resistance to whitening by impact, weather resistance, moldability and processability and can be widely used in automobile parts, lighting goods, various panels and the like.

What is claimed is:

1. An impact resistance modifier comprising a multilayered graft copolymer, comprising:

an innermost-layer polymer (A) obtained by polymerizing monomer components comprising 100 parts by mass of a monomer mixture comprising 40 to 100% by mass of an alkyl methacrylate having an alkyl group with carbon number of 1 to 4, 0 to 60% by mass of an alkyl acrylate having an alkyl group with carbon number of 1 to 8 and 0 to 20% by mass of another copolymerizable monomer and 0.1 to 10 parts by mass of a polyfunctional monomer;

an intermediate-layer polymer (B) obtained by polymerizing monomer components comprising 100 parts by mass of a monomer mixture comprising 70 to 90% by mass of an alkyl acrylate having an alkyl group with carbon number of 1 to 8, 10 to 30% by mass of an aromatic vinyl compound and 0 to 20% by mass of another copolymerizable monomer and 1 to 3 parts by mass of a polyfunctional monomer in the presence of the innermost-layer polymer (A); and an outer-layer polymer (C) having a Tg within the range of 20 to 80° C. and obtained by polymerizing monomer component(s) comprising 50 to 100% by mass of an alkyl methacrylate having an alkyl group with carbon number of 1 to 4, 0 to 50% by mass of an alkyl acrylate having an alkyl group with carbon number of 1 to 8 and 0 to 20% by mass of another copolymerizable monomer in the presence of a polymer which has been made up to the intermediate-layer polymer (B), wherein mass average particle diameter of the polymer which has been made up to the intermediate-layer polymer (B) is 200 to 300 nm, wherein the mass average particle diameter is evaluated using a capillary cartridge for particle fractionation and a carrier liquid at neutral pH, the mass ratio (A)/(B) of the innermost-layer polymer (A) to the intermediate-layer polymer (B) is 10/90 to 40/60 and the proportion of the outer-layer polymer (C) is 30 to 100 parts by mass when the sum of the innermost-layer polymer (A) and the intermediate-layer polymer (B) is set as 100 parts by mass.

2. A resin composition comprising a methacrylic resin composed mainly of constitutional units of methyl methacrylate and the impact resistance modifier according to claim 1.

* * * * *